United States Patent [19]

Yonekubo

[11] 4,108,794

[45] Aug. 22, 1978

[54] OIL IMMERSION LIQUID FOR FLUORESCENCE MICROSCOPES

[75] Inventor: Ken Yonekubo, Tama, Japan

[73] Assignee: Olympus Optical Co., Ltd., Japan

[21] Appl. No.: 655,949

[22] Filed: Feb. 6, 1976

[30] Foreign Application Priority Data

Feb. 14, 1975 [JP] Japan .................................. 50-18025

[51] Int. Cl.$^2$ .............................................. C09K 3/00
[52] U.S. Cl. ........................................ 252/408; 252/1; 350/179
[58] Field of Search ...................... 252/408, 1; 350/179

[56] References Cited

U.S. PATENT DOCUMENTS

| | | | |
|---|---|---|---|
| 2,978,298 | 4/1961 | Wetzel | 252/317 |
| 3,297,393 | 1/1967 | Ziegler | 350/179 |
| 3,437,402 | 4/1969 | Levins | 350/179 |
| 3,497,562 | 2/1970 | Levins | 350/179 |
| 3,639,260 | 2/1972 | Michalski | 252/309 |
| 3,876,288 | 4/1975 | Iwata et al. | 350/179 X |
| 3,929,667 | 12/1975 | Bautis | 252/408 |
| 3,979,301 | 9/1976 | Ushioda | 252/1 |

FOREIGN PATENT DOCUMENTS

| | | | |
|---|---|---|---|
| 1,472,294 | 2/1969 | Fed. Rep. of Germany | 350/179 |
| 2,606,064 | 2/1976 | Fed. Rep. of Germany | 350/179 |

*Primary Examiner*—Benjamin R. Padgett
*Assistant Examiner*—J. L. Barr
*Attorney, Agent, or Firm*—Cushman, Darby & Cushman

[57] ABSTRACT

An oil immersion liquid consisting of silicone oil for fluorescence microscopes which does not emit any auto fluorescence and therefore permits observing microscopic images of fluorescent substances with high contrast when such specimens are observed through oil immersion type objectives using this oil immersion liquid.

2 Claims, No Drawings

OIL IMMERSION LIQUID FOR FLUORESCENCE MICROSCOPES

BACKGROUND OF THE INVENTION a. Field of the invention

The present invention relates to an oil immersion liquid for use with fluorescence microscopes.

b. Description of the prior art

Objectives designed for a magnification of x100 and a numerical aperture N.A. of 1.25 or higher are required for studying chromosomes, etc. by using fluorescence microscopes. For this purpose, oil immersion type objectives are adopted for this type of fluorescence microscopes. However, fluorescence emitted from specimens to be observed is generally at a low intensity and satisfactory observation is impossible when images of specimens to be observed are not formed with high contrast. It is, therefore, impossible to satisfactorily observe images of fluorescent specimens when image contrast is degraded due to flare produced by the lens system or auto fluorescence emitted from a substance existing in the lens system or related components.

Conventionally, cargile oil and cedar oil are used as oil immersion liquids for ordinary microscopes but these oils emit auto fluorescence.

Further, distilled water which does not emit auto fluorescence, glycerin which emits weak auto fluorescence but scarcely affects fluorescence microscopy and cargile oil which emits relatively weak auto fluorescence are also used as oil immersion liquids for fluorescence microscopy. Of the above-mentioned oil immersion liquids, cargile oil emits certain degrees of auto fluorescence which unavoidably produces flare and affects fluorescence microscopic observations. Distilled water does not emit auto fluorescence and is deal for fluorescence microscopy in this respect. However, aberrations are corrected for cargile oil in general oil immersion type objectives, while distilled water has a refractive index (Nd = 1.333) which is largely different from that of cargile oil (Nd = 1.514). Therefore, distilled water will generally aggravates aberrations and, in addition, degrades resolution and image contrast, making it impossible to satisfactorily observe images of fluorescent specimens. As a result, it is required to use an objective specially designed for use with distilled water in order to use it as an oil immersion liquid for fluorescence microscopy. In addition, distilled water has another drawback that it has a surface tension which is too low to select a long working distance when it is used as an oil immersion liquid. Glycerin scarcely affects fluorescence microscopy with its auto fluorescence as described above and has a refractive index of 1.458 which is close to that of cargile oil, therefore being usable with objectives designed for use with cargile oil simply by slightly modifying the objectives. However, glycerin is moisture-absorptive and its refractive index decreases close down to that of distilled water as time elapses. This decrease in refractive index of glycerin degrades both resolution and image contrast similarly to the case where distilled water is used as an oil immersion liquid.

SUMMARY OF THE INVENTION

A general object of the present invention is to provide an oil immersion liquid for fluorescence microscopes which consists of silicone oil and permits favorably observing images of fluorescent specimens.

DESCRIPTION OF THE PREFERRED EMBODIMENTS

The present invention has been achieved by paying attention to the fact that silicone oil does not emit auto fluorescence at all and has a refractive index $Nd = 1.40$ which is relatively close to that of cargile oil. That is to say, the oil immersion liquid according to the present invention is available by using silicone oil as an oil immersion liquid for fluorescence microscopes.

When silicone oil is adopted as an oil immersion liquid for fluorescence microscopes, it emits no auto fluorescence like distilled water and, therefore, brings about no degradation in resolution or image contrast due to its auto fluorescence. Further, it has a refractive index close to that of cargile oil and therefore permits favorably observing images of fluorescent specimens without designing special objectives for fluorescence microscopes. For such fluorescence microscopy by using silicone oil as an oil immersion liquid, it will be sufficient to slightly adjust the conventionally designed objectives, for example, by slightly displacing some lens components of the objectives along their optical axes. Furthermore, silicone oil used as an oil immersion liquid is free from refractive index variation which degrade resolution and image contrast since silicone oil is not moisture-absorptive or volatile. Silicone oil has viscosity $Cs = 1.000$ to $3,000$ which is on the order similar to that of cargile oil and refractive index $Nd = 1.40$ which is relatively close to that of cargile oil. Therefore, silicone oil allows to select long working distances for objectives of fluorescence microscopes and can be used with general oil immersion type objectives designed for use with cargile oil through simple modification, for example, by slightly displacing the second lens component of the object system along its optical axis.

As is easily understood from the foregoing descriptions, the present invention provides an excellent oil immersion liquid which is free from auto fluorescence and variation in refractive index by adopting silicone oil as an oil immersion liquid for fluorescence microscopes.

I claim:

1. In a process for using a fluorescent microscope for studying materials which fluoresce in which an oil immersion objective is employed, the improvement consisting of using silicone oil having a refractive index $Nd = 1.40$ as the oil immersion liquid.

2. The process of claim 1, wherein said silicone oil has a viscosity $Cs = 1,000$ to $3,000$.

* * * * *